(12) United States Patent
Usuda et al.

(10) Patent No.: US 7,519,028 B2
(45) Date of Patent: Apr. 14, 2009

(54) CHANNEL STRUCTURE, METHOD FORMING THE SAME, RADIO BASE STATION, MOBILE STATION IN MOBILE COMMUNICATION SYSTEM

(75) Inventors: Masafumi Usuda, Yokosuka (JP); Takehiro Nakamura, Yokosuka (JP); Sadayuki Abeta, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 829 days.

(21) Appl. No.: 10/378,912

(22) Filed: Mar. 5, 2003

(65) Prior Publication Data
US 2003/0169707 A1   Sep. 11, 2003

(30) Foreign Application Priority Data
Mar. 5, 2002 (JP) .............................. 2002-059444

(51) Int. Cl.
*H04Q 7/00* (2006.01)
(52) U.S. Cl. .......................................... 370/334
(58) Field of Classification Search ................ 370/334, 370/320, 335, 252, 342, 238, 235
See application file for complete search history.

(56) References Cited

U.S. PATENT DOCUMENTS

| | | | |
|---|---|---|---|
| 6,611,675 B1 * | 8/2003 | Salonen et al. ................. | 455/69 |
| 6,804,216 B1 * | 10/2004 | Kuwahara et al. ........... | 370/335 |
| 6,839,326 B1 * | 1/2005 | Pajukoski et al. ........... | 370/252 |
| 7,002,939 B1 * | 2/2006 | Hiramatsu ................... | 370/335 |
| 7,286,500 B1 * | 10/2007 | Bhatoolaul et al. .......... | 370/320 |
| 7,346,126 B2 * | 3/2008 | Nilsson et al. .............. | 375/316 |
| 2004/0136342 A1 * | 7/2004 | Pedersen et al. ............ | 370/335 |

FOREIGN PATENT DOCUMENTS

| | | |
|---|---|---|
| EP | 1 204 282 A1 | 5/2002 |
| JP | 11-088941 | 3/1999 |
| JP | 2001-339758 | 12/2001 |

(Continued)

OTHER PUBLICATIONS

3GPP, 3rd Generation Partnership Project; Technical Specification Group Radio Access Network; Physical channels and mapping of transport channels onto physical channels (FDD), 3G TS 25.211 version 3.1.0, http://www.3gpp.org, 1999, pp. 1-37.

(Continued)

*Primary Examiner*—Lester Kincaid
*Assistant Examiner*—Diego Herrera
(74) *Attorney, Agent, or Firm*—Oblon, Spivak, McClelland, Maier & Neustadt, P.C.

(57) ABSTRACT

A channel structure of a mobile communication system including a radio base station having a transmission antenna able to control a beam direction for each of a plurality of mobile stations in a cell. The mobile stations carry out radio communication using a shared channel together with an associated dedicated channel used in association with the shared channel. The shared channel is shared by the mobile stations and allocated to each of the mobile stations per predetermined unit transmission. A first pilot channel is set and dedicatedly used for channel estimation of the shared channel, and a second pilot channel is set and dedicatedly used for channel estimation of the associated dedicated channel.

1 Claim, 14 Drawing Sheets

FOREIGN PATENT DOCUMENTS

WO      WO 01/91491 A1      11/2001

OTHER PUBLICATIONS

Universal Mobile Telecommunications Systems (UMTS); Physical channels and mapping of transport channels onto physical channels (FDD), ETSI TS 125 211 V3.1.1, XP-002151815, Nov. 2, 2000, pp. 1-37.

Masafumi Usuda, et al., "Optimizing the Number of Dedicated Pilot Symbols for Forward Link in W-CDMA Systems", VTC 2000-Spring. 2000 IEEE 51ST. Vehicular Technology Conference Proceedings, vol. 3 of 3, conf. 51, XP-000968378, May 15, 2000, pp. 2118-2122.

Tomas Hedberg, et al., "Evolving WCDMA", Ericsson Review, No. 2, XP-002228837, 2000, pp. 124-131.

\* cited by examiner

FIG.5

| ITEM | SETTING VALUE |
|---|---|
| ● ● ● | ● ● ● |
| USE OF P-CPICH FOR A-DPCH PHASE REFERENCE | NOT ALLOWED |
| USE OF S-CPICH FOR A-DPCH PHASE REFERENCE | NOT ALLOWED |
| ● ● ● | ● ● ● |
| USE OF P-CPICH FOR HS-DSCH PHASE REFERENCE | NOT ALLOWED |
| USE OF S-CPICH FOR HS-DSCH PHASE REFERENCE | ALLOWED (CODE NUMBER) |
| ● ● ● | ● ● ● | ced. On the other hand, in downlink direction, TPC commands for uplink A-DPCH, or information for call control are transmitted.

CHANNEL STRUCTURE, METHOD FORMING THE SAME, RADIO BASE STATION, MOBILE STATION IN MOBILE COMMUNICATION SYSTEM

BACKGROUND OF THE INVENTION

1. Field of the Invention

The present invention relates to a channel structure, a method for forming the channel structure, a radio base station, and a mobile station in a mobile communication system able to improve system capacity and communication quality.

2. Description of the Related Art

In specifications set by 3GPP (3rd Generation Partnership Project), which is one of the standards organizations on mobile and wireless communication systems for establishing standards of the wideband CDMA (W-CDMA: Wideband-Code Division Multiple Access), the so-called Downlink Shared Channel (DSCH), the shared channel used in downlink (a link from a base station to a mobile station) data communication, is defined as one of the channels shared by a plurality of users (mobile stations). Because DSCH is allocated to every mobile station per unit transmission (for example, for every frame) for use, it is expected to be used in high speed downlink packet transmission.

In addition, in 3GPP, studies are being made in standardizing HSDPA (High Speed Downlink Packet Access) that enables realization of high speed downlink packet transmission (about 8-10 Mbps). HSDPA is a transmission scheme for adaptively and fast changing modulation schemes (16 QAM, adaptive modulation coding scheme and so on) in response to variations of the propagation environment, or error correction coding rates. By adaptively controlling these modulation schemes, it will be possible to use the existing DSCH as a high-speed shared channel. In 3GPP, the high-speed shared channel used in HSDPA is defined as a "high speed downlink shared channel (HS-DSCH)". Next, structure and functions of channels used in HSDPA are explained.

(Channel Structure of HSDPA)
 1. Downlink Shared Channel (HS-DSCH)
 2. Primary Common Pilot Channel (P-CPICH)
 3. Secondary Common Pilot Channel (S-CPICH)
 4. Associated Dedicated Physical Channel (A-DPCH)

(Explanation of Functions of the Above Channels)

HS-DSCH is a downlink communication channel shared by a plurality of mobile stations, and is allocated to each different user (a mobile station) at a short interval (for example, at every 2 ms). In W-CDMA systems, pilot channels for constantly transmitting signals from a base station providing services include common pilot channels (CPICH), and P-CPICH and S-CPICH belong to CPICH. P-CPICH and S-CPICH are reference channels used as reference symbols when a mobile station measures the downlink quality or performs coherent detections. In order to use P-CPICH as a phase reference signal for PCCPCH (Primary Common Control Physical Channel) for cell selection or annunciation information transmission in a mobile station, it is necessary to send signals to the entire sector of a radio base station. In contrast, P-CPICH is able to transmit signals in designated directions. A-DPCH includes a pair of channels for uplink and downlink set up between each mobile station and the base station for communications with HS-DSCH. In uplink direction, in addition to uplink user data, control data such as the downlink quality information and the TPC (Transmission Power Control) bit for downlink A-DPCH are also transmit- When HS-DSCH is used in a radio base station having a beam forming antenna able to switch the beam direction to each transmission destination, that is, each user, in HS-DSCH channel estimation (that means estimation of variations of phases and amplitudes of received signals using reference signals), the same pilots as that used in A-DPCH channel estimation is used. Accordingly, when the HS-DSCH is used in the radio base station having the beam forming function for forming the specific beam for each mobile station, one of the following two methods are used.

1). As shown in FIG. 13, radio base station 100 does not transmit S-CPICH, and the mobile station A201 uses the dedicated pilots arranged in A-DPCH for channel estimation during demodulation of HS-DSCH and A-DPCH, while the mobile stations B202 and C203 use the same for channel estimation during demodulation of A-DPCH.

2). As shown in FIG. 14, radio base station 100 transmits S-CPICH to each user (mobile stations A201, B202, C203), and when HS-DSCH and A-DPCH are demodulated, not only A-DPCH, but also S-CPICH are used for channel estimation. Accordingly, pilots the same as the dedicated channel associated with the shared channel are used in channel estimation of the shared channel.

Japanese Unexamined Patent Publication (Kokai) No. 11-88941 discloses a technique related to the pilot channel setting of communication channels. In this technique, it is proposed that a high-speed communication channel use the dedicated pilot channel associated with each communication channel, and a low speed communication channel use a common pilot channel shared by a plurality of communication channels.

However, in the above two methods for channel estimation, when the former one is used, there exists a probability the received power is not sufficient for HS-DSCH channel estimation, in other words, since A-DPCH is a relatively slow channel and transmitted by lower electric power, the power carried by the dedicated pilots may also be insufficient. In this case, the accuracy of channel estimation declines. The reception characteristics do not deteriorate too much for low power channels such as A-DPCH, even if the accuracy of channel estimation declines, but it does degrade noticeably for high transmission speed and high power channels such as HS-DSCH. Furthermore, when this method is used, it is impossible to measure the downlink quality by a mobile station.

In addition, when the latter one of the above two methods is used, system capacity may degrade because of increments of interference arising from transmission of S-CPICH to every user. In other words, since a large portion of the power transmitted from a radio base station is allocated to S-CPICH, the transmission power of other channels (including HS-DSCH) becomes low, and this leads to degradation of the system capacity. Furthermore, if more S-CPICHs are allocated, since more channelization codes have to be used, code resources may become insufficient, and consequently, degradation of the system capacity resources happens due to the insufficient codes.

SUMMARY OF THE INVENTION

Accordingly, it is a general object of the present invention to solve the above problems of the related art.

A more specific object of the present invention is to provide a channel structure, a method for forming the channel structure, a radio base station and a mobile station in a mobile communication system of high quality without system capacity degradation.

To attain the above object, according to a first aspect of the present invention, there is provided a channel structure of a mobile communication system including a radio base station having a transmission antenna able to control a beam direction for each of a plurality of mobile stations in a cell, said mobile stations carrying out radio communication using a shared channel together with an associated dedicated channel used in association with said shared channel, said shared channel being shared by said mobile stations and allocated to each of said mobile stations per predetermined unit transmission, wherein a first pilot channel is set and dedicatedly used for channel estimation of said shared channel, and a second pilot channel is set and dedicatedly used for channel estimation of said associated dedicated channel.

According to the above channel structure, the pilot channel providing sufficient electric power for channel estimation is only used as the pilot channel for channel estimation of the shared channel that is shared by a plurality of the mobile stations, while as the pilot channel used for channel estimation of the associated dedicated channel used in association with the shared channel, use is made of a pilot channel of relatively low electric power. Therefore, it is possible to reduce downlink interference in high speed data communication, and avoid degradation of the system capacity.

To attain the above object, according to a second aspect of the present invention, there is provided a method for forming a channel structure of a mobile communication system including a radio base station having a transmission antenna able to control a beam direction for each of a plurality of mobile stations in a cell, said mobile stations carrying out radio communication using a shared channel together with an associated dedicated channel used in association with said shared channel, said shared channel being shared by said mobile stations and allocated to each of said mobile stations per predetermined unit transmission, comprising the steps of setting a first pilot channel dedicatedly used for channel estimation of said shared channel, and setting a second pilot channel dedicatedly used for channel estimation of said associated dedicated channel.

To attain the above object, according to a third aspect of the present invention, there is provided a radio base station for transmitting downlink packet data to a plurality of mobile stations by using a shared channel together with an associated dedicated channel used in association with the shared channel, said shared channel being shared by said mobile stations and allocated to each said mobile station per predetermined unit transmission, comprising a pilot channel setting unit for dedicatedly setting a first pilot channel used for channel estimation of said shared channel, and a second pilot channel used for channel estimation of said associated dedicated channel.

Furthermore, to attain the above object, according to a fourth aspect of the present invention, there is provided a mobile station for carrying out radio communication with a radio base station by using a shared channel together with an associated dedicated channel used in association with the shared channel, said shared channel being shared by a plurality of said mobile stations and allocated to each said mobile station per predetermined unit transmission, comprising a channel estimation unit for receiving a dedicated pilot channel from said radio base station and using the dedicated pilot channel for channel estimation of said shared channel and said associated dedicated channel.

These and other objects, features, and advantages of the present invention will be more apparent from the following detailed description of the preferred embodiments given with reference to the accompanying drawings.

BRIEF DESCRIPTION OF THE DRAWINGS

FIG. 5 is a view showing an example of information elements of mobile communication setting in the sequence shown in FIG. 4;

DESCRIPTION OF THE PREFERRED EMBODIMENTS

Below, preferred embodiments of the present invention will be explained with reference to the accompanying drawings. In the following explanations, "shared channel" is used to indicate a downlink channel for high-speed data communication and shared by a number of mobile stations, such as DSCH (including HS-DSCH). Further, in the following explanations, although HS-DSCH is used to explain the shared channel, the present invention is not limited to HS-DSCH; it is applicable to any shared channels having the same concept.

Figure 1:
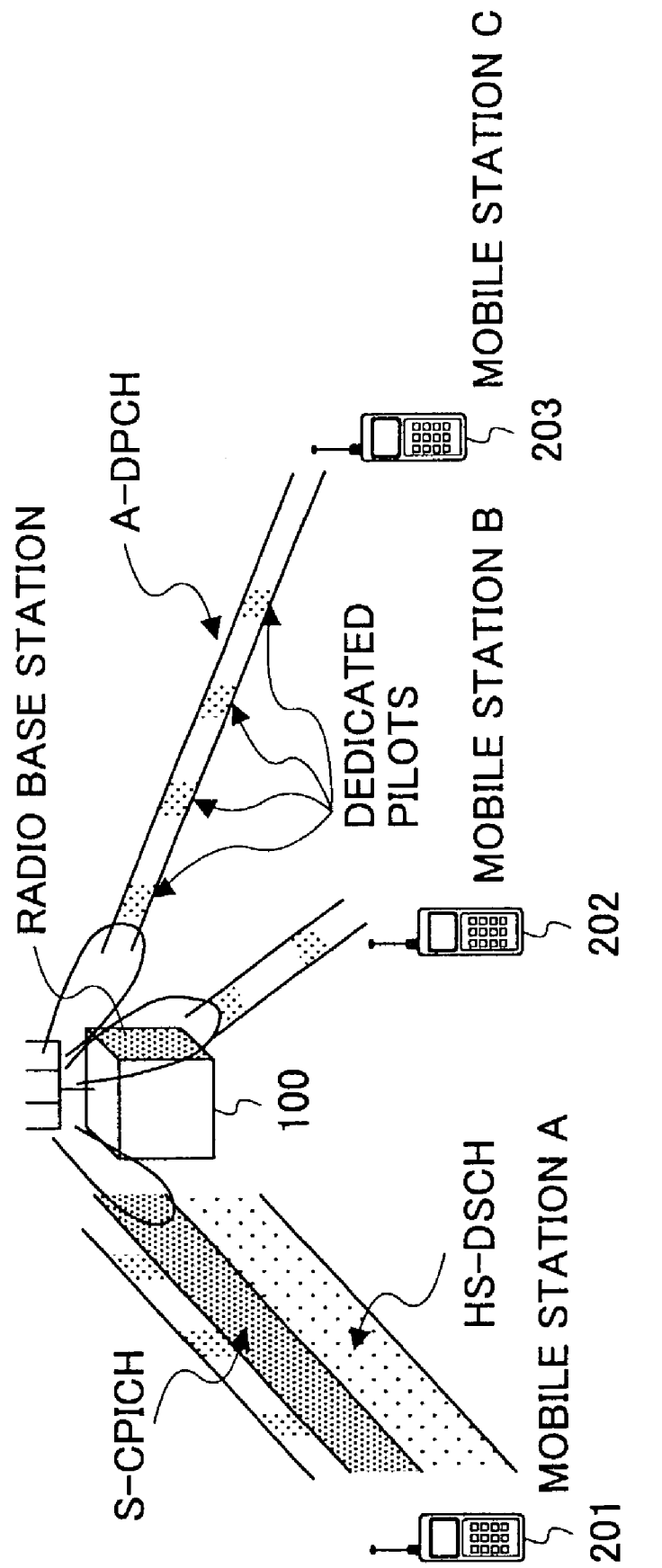
FIG. 1 is a view for explaining a channel structure of a mobile communication system according to a first embodiment of the present invention.

FIG. 1 is a conceptual view for explaining a channel structure of a mobile communication system related to the first embodiment of the present invention.

It is shown in FIG. 1 that a radio base station 100 performs radio communication with three mobile stations A201, B202, and C203. The mobile communication system shown in FIG. 1, for example, is a W-CDMA communication system, and the radio base station 100 is equipped with a transmitting antenna able to control the beam direction to each mobile station (mobile stations A201, B202, and C203), for example, an adaptive array antenna. FIG. 1 shows downlink packet transmission from the radio base station 100, and mobile stations A201, B202, and C203 share HS-DSCH allocated by the radio base station 100, and are adapted to be able to receive high speed downlink packet data.

In the channel structure of the present invention, the radio base station 100 allocates the secondary common pilot channel, that is, S-CPICH, only to mobile station 201 to which HS-DSCH has been allocated. At mobile station 201 to which S-CPICH is allocated, channel estimation, coherent, and data restoration are performed using the received S-CPICH. At mobile stations 202 and 203 to which HS-DSCH is not allocated, channel estimation and other reception processing functions are performed by using dedicated pilots arranged in a dedicated channel (in this example, it is A-DPCH, Associated Dedicated Channel).

First Embodiment

Figure 2:
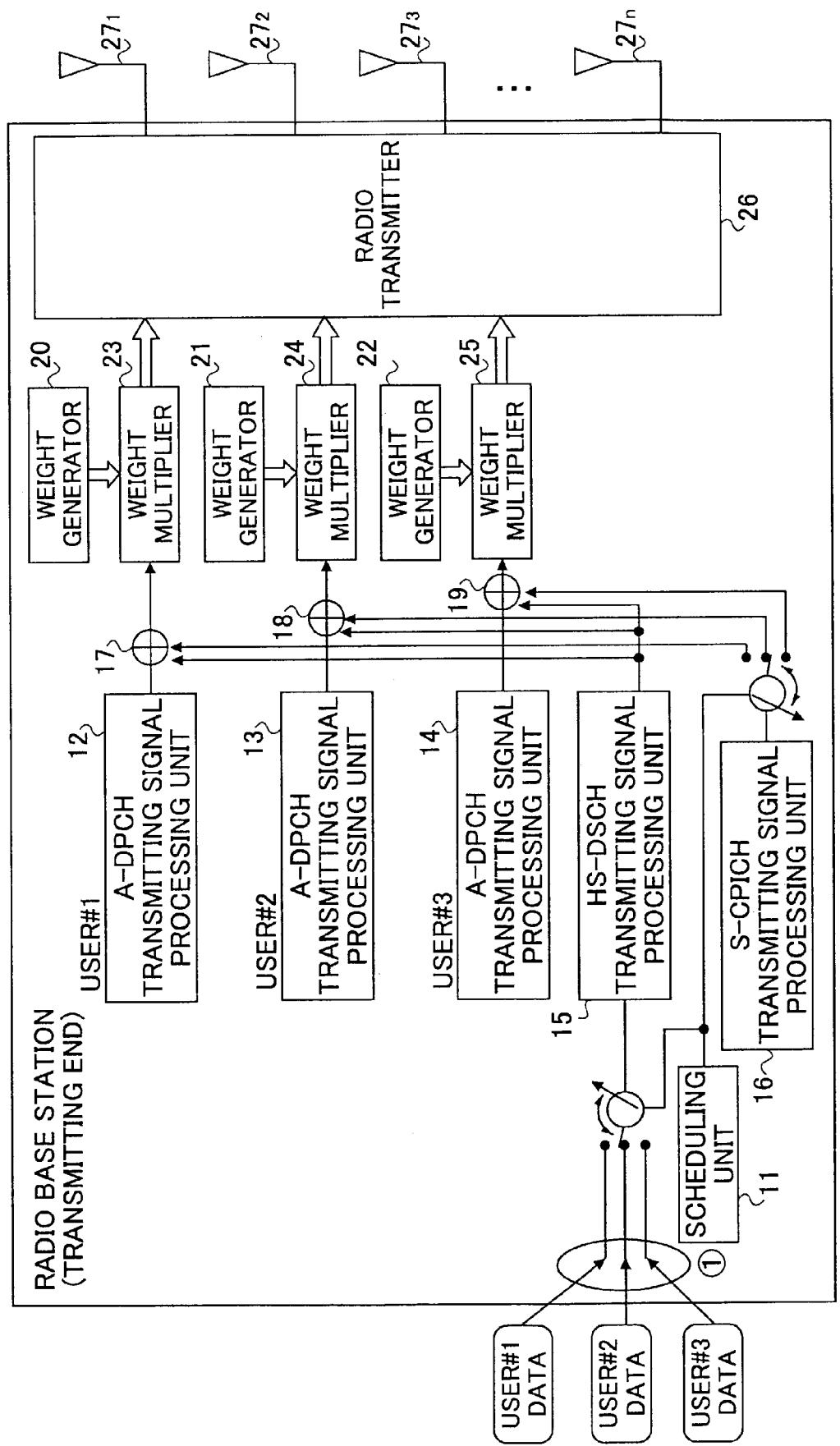
FIG. 2 is a block diagram showing a schematic configuration of a transmitting end of a radio base station according to the first embodiment of the present invention.

FIG. 2 is a block diagram showing a schematic configuration of a transmitting end of the radio base station 100 shown in FIG. 1. The radio base station 100 related to the first embodiment of the present invention allocates S-CPICH only to mobile station 201 to which HS-DSCH has been allocated.

The transmitting end of the radio base station 100 shown in FIG. 1 is comprised of a scheduling unit 11, A-DPCH transmitting-signal processing units 12 through 14, an HS-DSCH transmitting signal processing unit 15, an S-CPICH transmitting signal processing unit 16, accumulators 17 through 19, weight generators 20 through 22, weight multipliers 23 through 25, a radio transmitter 26, and transmitting antennas $27_1$ through $27_n$.

Next, operation of the transmitting end of the radio base station 100 having the above configuration will be explained.

(Operation of Radio Base Station Transmitting End)

The thick arrows in FIG. 2 indicate the state of parallel input and output of a number of signal sequences related to the transmitting antennas $27_1$ through $27_n$. Here, it is assumed that user data No. 1 through No. 3 from mobile station users (here, denoted as user No. 1 through user No. 3) are separately input to an input port 1. Further, A-DPCH transmitting signal processing units 12 through 14 are respectively allocated to all mobile stations able to receive HS-DSCH. Here, it is assumed there are three mobile stations that can receive HS-DSCH. Thus, each user (user No. 1, No. 2, and No. 3) is equipped with respective A-DPCH transmitting signal processing units 12 through 14.

The scheduling unit 11 decides the order of transmission of data in user data No. 1, No. 2, or No. 3, and switches the user data (No. 1, No. 2, No. 3) to be output to the HS-DSCH transmitting signal processing unit 15. Once user data decided by the scheduling unit 11 is input to the HS-DSCH transmitting signal processing unit 15, in the HS-DSCH transmitting signal processing unit 15, the user data is coded in block, and is spread by using channelization codes. The spread user data is added to the A-DPCH to be transmitted at this moment and is output to a weight multiplier. For example, if the spread user data output from the HS-DSCH transmitting signal processing unit 15 is user data No. 1, in the accumulator 17, user data No. 1 is added to A-DPCH output from the A-DPCH transmitting signal processing unit 12.

A-DPCH transmitting signal processing units 12 and 13 convert the dedicated pilot bits, data bits, and the other control bits into blocks, then spread them by using channelization codes (usually the orthogonal code series). The spread A-DPCH transmission signals are output to accumulators 17 through 19. In weight generators 20 through 22, weight coefficients (antenna weights) are generated so that directions of transmitting beams emitted from transmitting antennas $27_1$ through $27_n$ are in good coincidence with directions of mobile stations. Concerning methods for generating those weights, for example, the uplink receiving signals may be used to do that, but any other methods may also be used if they are able to generate weight coefficients making the beams point to the mobile stations.

In S-CPICH transmitting signal processing unit 16, data bits in an S-CPICH pattern (as a pilot channel, the pattern is preset) are spread by using channelization codes. The transmitting signals output from the S-CPICH transmitting signal processing unit 16 are added to the user data at a certain moment decided by the scheduling unit 11, and to A-DPCH and HS-DSCH used by the user data. For example, in weight multiplier 23, the signal summed at the accumulator 17 is multiplied by the weight factor generated by the weight generator 20. Signals output from weight multiplier 23 are shaped and frequency transformation is carried out in the radio transmitter 26. Then these signals are sent to transmitting antennas $27_1$ through $27_n$. In transmitting antennas $27_1$ through $27_n$, the transmitting beams are emitted pointing in the direction of the mobile station. Note that, for mobile stations to which HS-DSCH is not allocated, only A-DPCH is present, and transmission can be done by processing A-DPCH in the same way as above.

Figure 3:
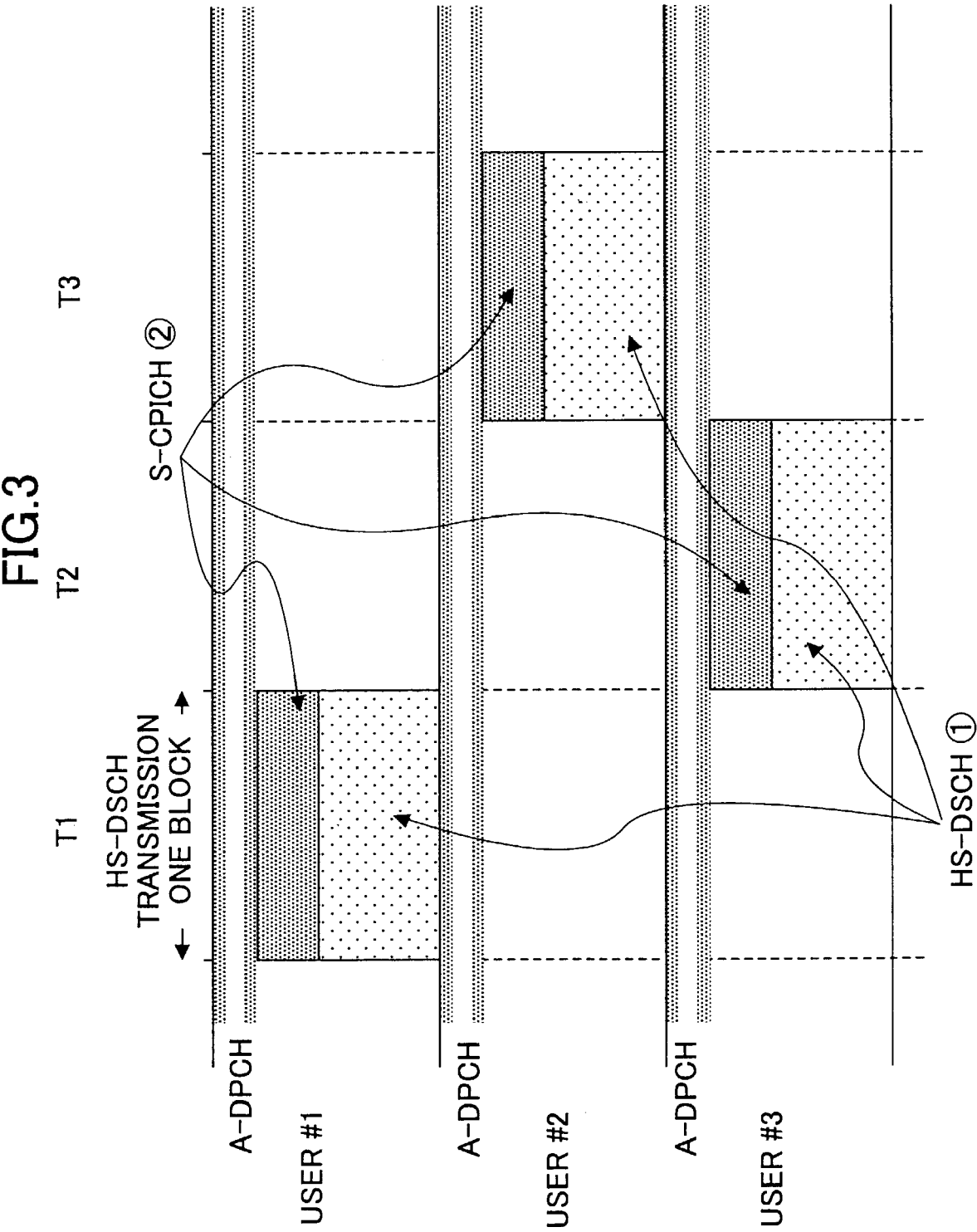
FIG. 3 is view showing an example of a time-varying transmission allocation of channels in the radio base station according to the first embodiment of the present invention.

FIG. 3 is view showing an example of a time-varying transmission allocation of channels in the radio base station 100 related to the first embodiment of the present invention. As shown in FIG. 3, in each time section (T1, T2, T3, . . . ), A-DPCH is transmitted successively to mobile station users No. 1 through No. 3, while HS-DSCH is transmitted to selected users because of the scheduling function of the scheduling unit 11. Further, S-CPICH is transmitted in association with HS-DSCH of the selected users, and is used as a pilot channel of HS-DSCH.

Figure 4:
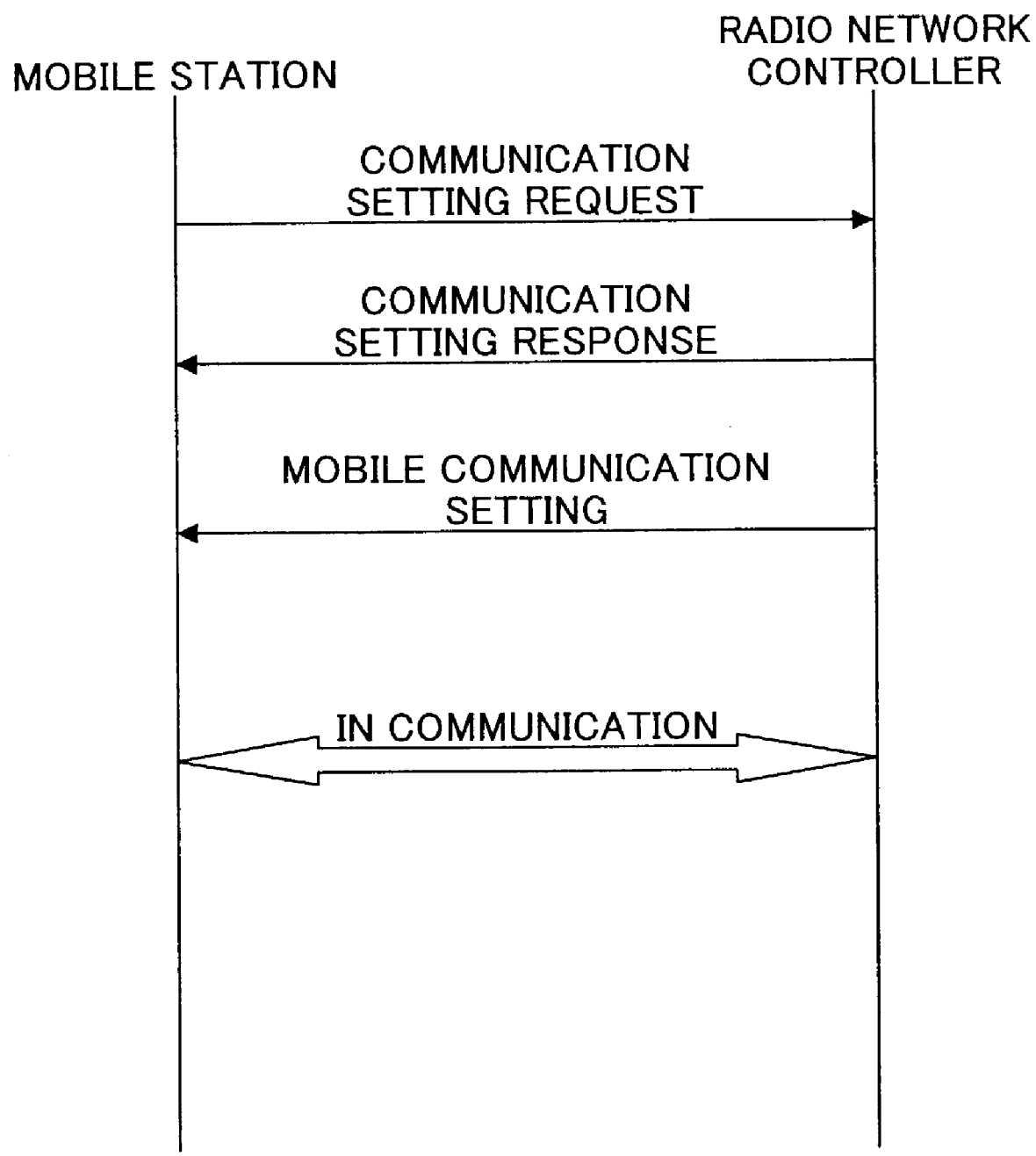
FIG. 4 is a view of a sequence showing an example of signal exchange between a mobile station and a radio network controller that is the host node of the radio base station of the first embodiment of the present invention.

FIG. 4 is a view of a sequence showing an example of signal exchange between a mobile station and a radio network controller that is the host node of the radio base station 100 of the first embodiment of the present invention. As shown in FIG. 4, for example, a mobile station makes a request for communication using HS-DSCH to the radio network controller (communication setting request). Receiving this request, the radio network controller gives back a response of accepting the request (communication setting response), and notifies the mobile station of various setting conditions relevant to A-DPCH or HS-DSCH (mobile communication setting). After the step of mobile communication setting, that is, notices from the radio network controller, is finished, the mobile station starts communication.

FIG. 5 is a view showing an example of information elements of mobile communication setting in the sequence shown in FIG. 4. As shown in FIG. 5, among the information elements, neither P-CPICH nor S-CPICH is used as the phase reference signal of A-DPCH (indicated as "not allowed" in the column of "setting value" in FIG. 5), but use is made of the dedicated pilots arranged in A-DPCH. Furthermore, it is shown in the relevant information elements that not P-CPICH but S-CPICH is used as the pilot channel of HS-DSCH. Note that, as shown in the relevant information elements, when S-CPICH is used, replacement is possible by writing down its code number.

As shown above, according to the first embodiment, because the radio base station uses S-CPICH as a pilot channel to transmit only to the mobile station to which HS-DSCH has been allocated, it is possible to save transmission electric power and code resources, and increase the system capacity.

Second Embodiment

Figure 6:
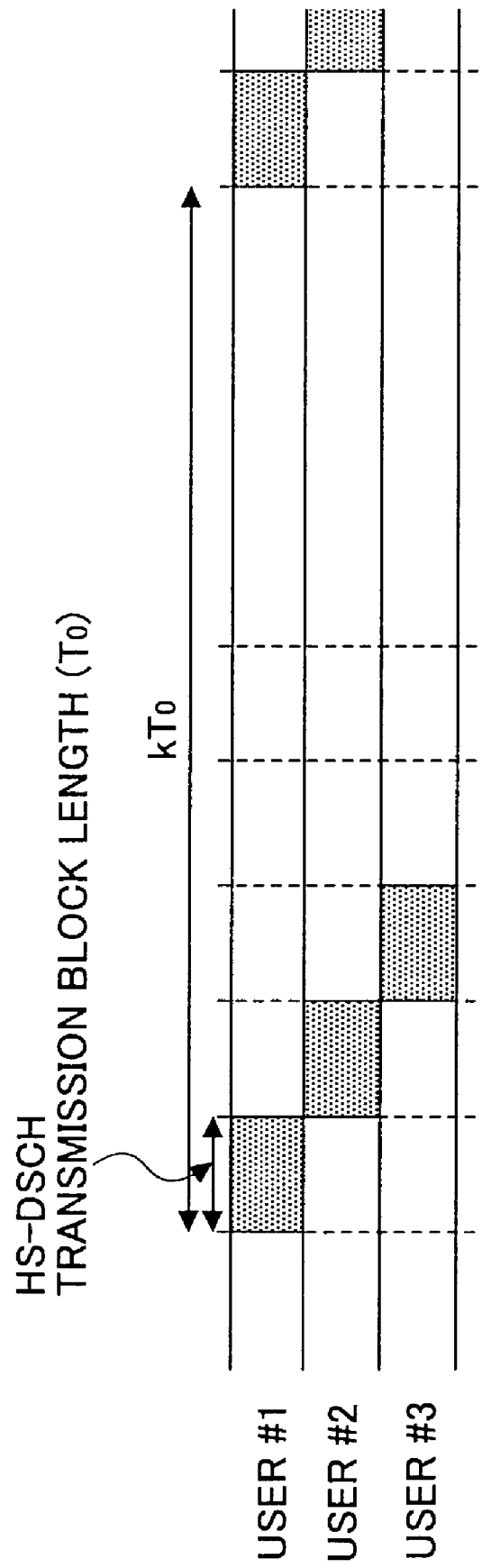
FIG. 6 is a view showing an example of a time-varying transmission allocation of S-CPICH allocated at a radio base station according to a second embodiment of the present invention.

The radio base station related to present embodiment has essentially the same configuration as that of the first embodiment. FIG. 6 is a view showing an example of a time-varying transmission allocation of S-CPICH allocated at the radio base station according to the second embodiment of the present invention. In the second embodiment of the present invention, S-CPICH is allocated for every k transmission blocks in a time interval in which a mobile station measures the downlink quality. Of course, as shown in the first embodiment, S-CPICH may be transmitted to the mobile station to which HS-DSCH has been allocated.

As shown above, according to the second embodiment, because S-CPICH is allocated in a time interval in which a mobile station measures the downlink quality, and in the time section for HS-DSCH transmission, shortage of the transmission electric power and code resources due to usage of S-CPICH can be limited, and this enables incrementing of system capacity and improvement of communication quality.

Third Embodiment

Figure 7:
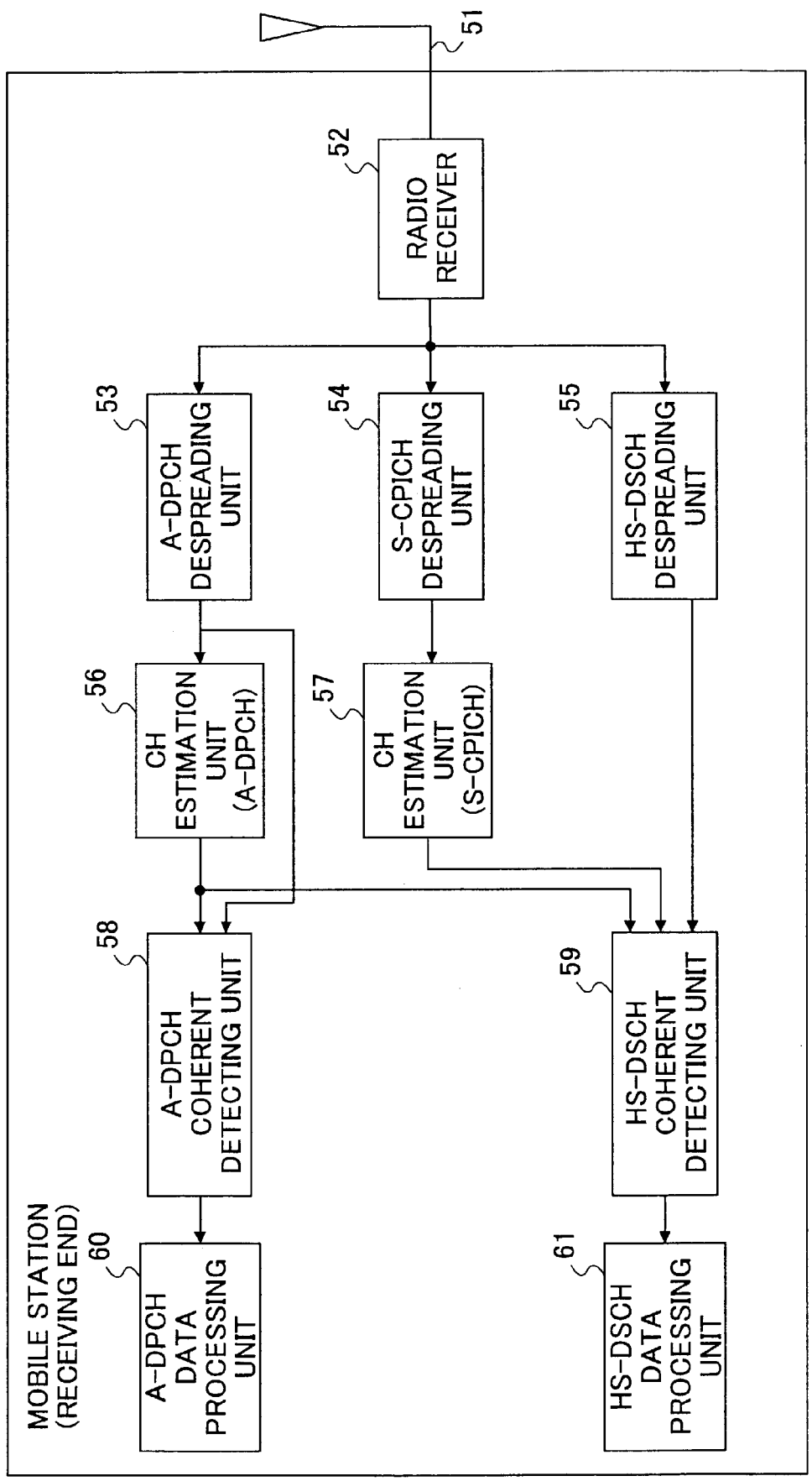
FIG. 7 is a block diagram showing a schematic configuration of a receiving end of a mobile station according to a third embodiment of the present invention.

FIG. 7 is a block diagram showing a schematic configuration of a receiving end of a mobile station (for example, the mobile station 201 shown in FIG. 1) related to the third embodiment of the present invention.

The receiving end of the mobile station shown in FIG. 7 is comprised of a receiving antenna 51, a radio receiver 52, an A-DPCH despreading unit 53, an S-CPICH despreading unit 54, an HS-DSCH despreading unit 55, a channel (CH) estimation unit (A-DPCH) 56, a CH estimation unit (S-CPICH) 57, an A-DPCH coherent detecting unit 58, an HS-DSCH coherent detecting unit 59, an A-DPCH data processing unit 60, and an HS-DSCH data processing unit 61.

Next, operation of the receiving end of the mobile station having the above configuration will be explained.

(Operation of Mobile Station Receiving End)

As shown in FIG. 7, radio signals received at the receiving antenna 51 are transformed in frequency, and are shaped, sampled and quantized in the radio receiver 52, and then are input to the respective despreading units 53, 54, 55 of A-DPCH, S-CPICH, and HS-DSCH. In the despreading units 53, 54, 55, by multiplying the spreading code of each channel, a symbol sequence of each channel (despread signals) is obtained. The A-DPCH despread signals output from the A-DPCH despreading unit 53 are input to the CH estimation unit (A-DPCH) 56 and the A-DPCH coherent detecting unit 58. In the CH estimation unit (A-DPCH) 56, the dedicated pilots of A-DPCH are extracted. By going back to the known phase patterns of the extracted pilots and taking their average, an estimated channel value is obtained. While, the S-CPICH despread signals output from the S-CPICH despreading unit 54 are input to the CH estimation unit (S-CPICH) 57, and in the CH estimation unit (S-CPICH) 57, by going back to the known phase patterns of S-CPICH and taking their average, an estimated channel value can be obtained.

Figure 8:
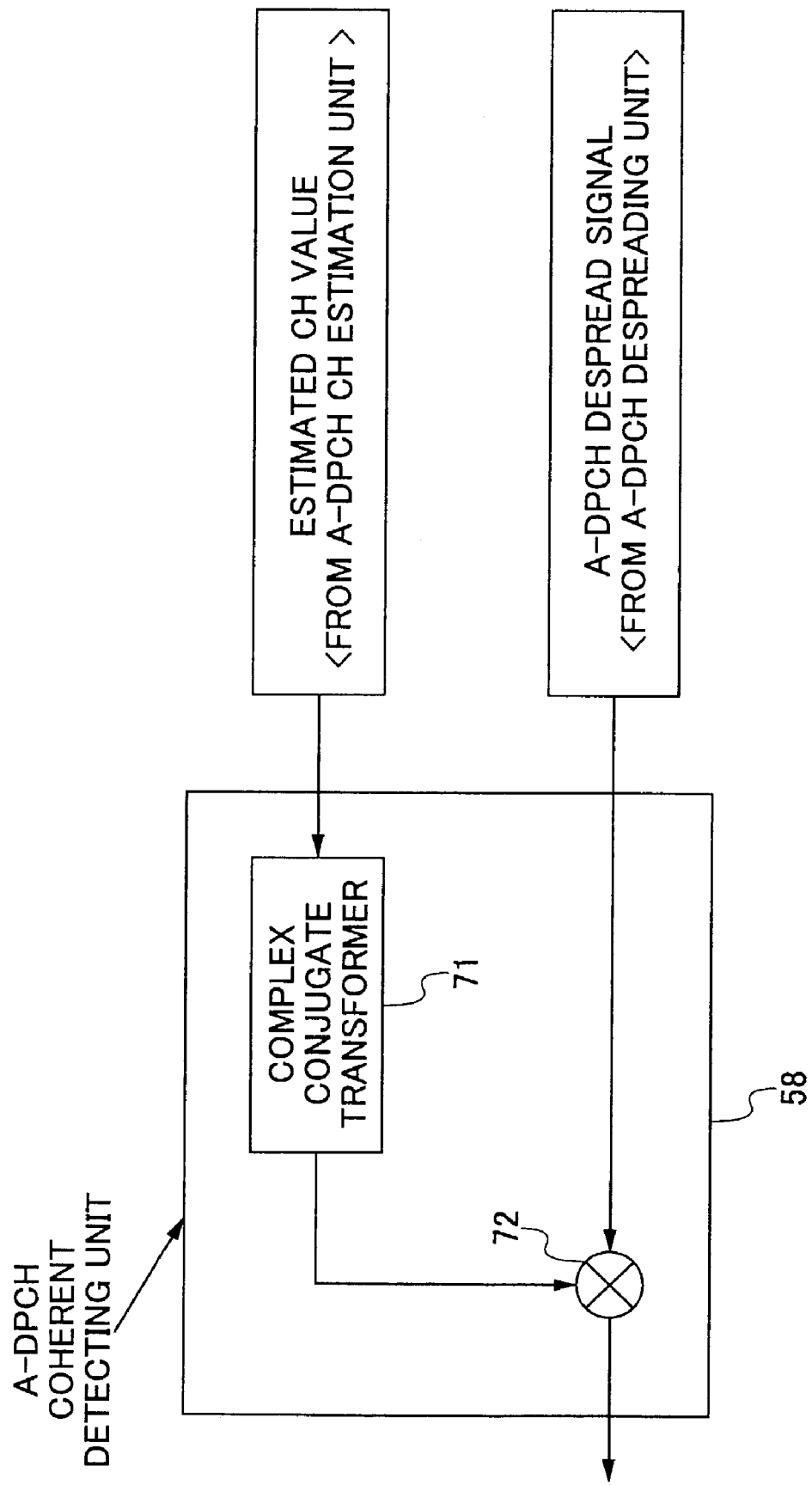
FIG. 8 is a view showing a schematic configuration of an A-DPCH coherent detecting unit in the mobile station shown in FIG.7.

FIG. 8 is a view showing a schematic configuration of the A-DPCH coherent detecting unit 58 in the mobile station shown in FIG. 7. The A-DPCH coherent detecting unit 58 shown in FIG. 8 is comprised of a complex conjugate transformer 71 and a multiplier 72. As shown in FIG. 8, in the complex conjugate transformer 71, complex conjugate transformation is carried out for the estimated channel value input from the CH estimation unit (A-DPCH) 56. Then in the multiplier 72, the transformed estimated channel value is multiplied with the A-DPCH despread signals output from the A-DPCH despreading unit 53, thereby being restored to the A-DPCH data symbol.

Figure 9:
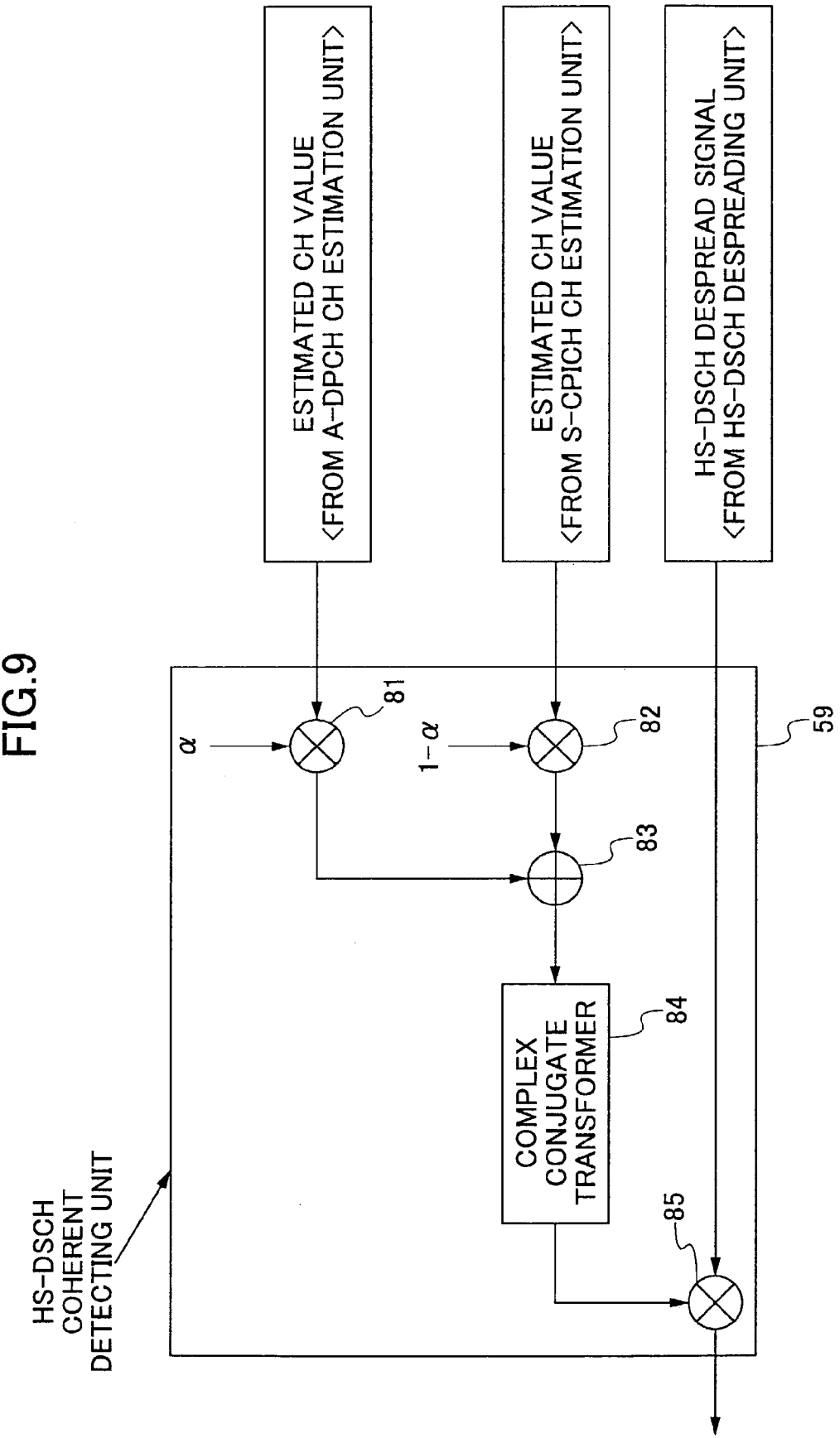
FIG. 9 is a view showing a schematic configuration of an HS-DSCH coherent detecting unit in the mobile station shown in FIG.7.

FIG. 9 is a view showing a schematic configuration of the HS-DSCH coherent detecting unit 59 in the mobile station shown in FIG. 7. The HS-DSCH coherent detecting unit 59 shown in FIG. 7 is comprised of multipliers 81, 82, 85, an accumulator 83, and a complex conjugate transformer 84. As shown in FIG. 9, the accumulator 83 adds the product from the multiplier 81 of the estimated channel value output from the CH estimation unit (A-DPCH) 56 and the weight coefficient $\alpha$, and the product from the multiplier 82 of the estimated channel value output from the CH estimation unit (S-CPICH) 57 and the weight coefficient 1-$\alpha$, so an estimated channel value is obtained.

The weight coefficient $\alpha$ shown in FIG. 9 is a weight coefficient of the estimated channel value obtained from A-DPCH, but the estimated channel value may also be obtained by using S-CPICH only (setting $\alpha$ as 0). In this case, since it is possible to omit the element block for inputting the estimated channel value obtained from the channel estimation unit (A-DPCH) 56 in the HS-DSCH coherent detecting unit 59, the HS-DSCH coherent detecting unit 59 can be configured relatively easily.

As shown above, in the complex conjugate transformer 84, the complex conjugate transformation is carried out for the estimated channel value combined in the accumulator 83 (or the estimated channel value obtained from the CH estimation unit (S-CPICH)), and then in the multiplier 85, the transformed estimated channel value is multiplied with the HS-DSCH despread signals output from the HS-DSCH despreading unit 55, thereby being restored to the HS-DSCH data symbol.

Figure 10:
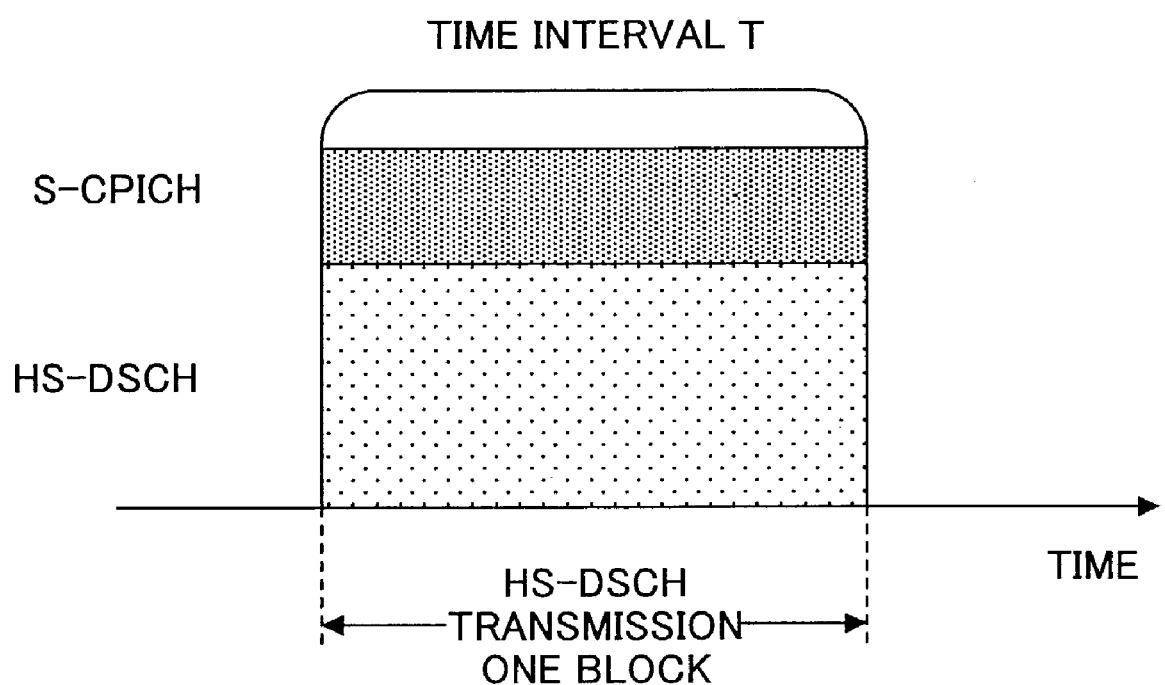
FIG. 10 is a view schematically showing receiving signals of S-CPICH and HS-DSCH along the time axis when one block of HS-DSCH is allocated to a mobile station.

FIG. 10 is a view schematically showing receiving signals of S-CPICH and HS-DSCH along the time axis when one block of HS-DSCH is allocated to a mobile station. The time interval T shown in FIG. 10 is a time interval in which the transmission block of HS-DSCH is allocated to a mobile station. The mobile station estimates channels by using S-CPICH despread signals only in the same time interval.

As shown above, according to the third embodiment, S-CPICH is used when a mobile station detects coherent of HS-DSCH. That is, channel estimation is performed by using S-CPICH only that is transmitted in a time interval in which S-CPICH is at the same direction as that of HS-DSCH transmitted to the mobile station, therefore it is possible to prevent signal deterioration due to averaging of signals of different directions, and high accuracy of channel estimation is obtainable. As a result, it is possible to avoid the degradation of communication quality.

Fourth Embodiment

Figure 11:
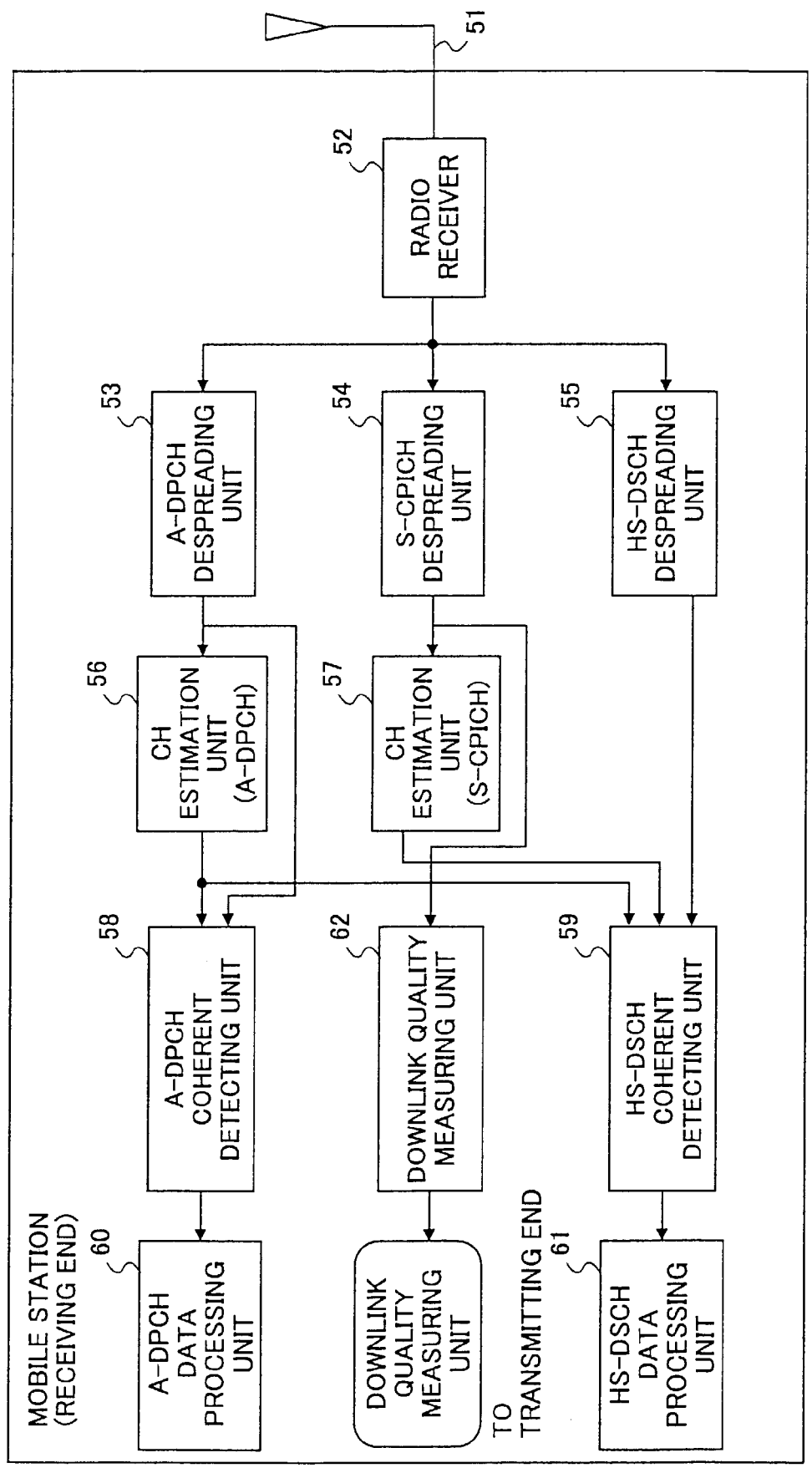
FIG. 11 is a block diagram showing a schematic configuration of a receiving end of a mobile station according to a fourth embodiment of the present invention.

FIG. 11 is a block diagram showing a schematic configuration of a receiving end of a mobile station related to the fourth embodiment of the present invention. The receiving end of the mobile station shown in FIG. 11 has essentially the same configuration as that of the third embodiment, except that a downlink quality measuring unit 62 is provided in the present embodiment.

Next, operation of the receiving end of the mobile station having the above configuration will be explained.

(Operation of Mobile Station Receiving End)

The downlink quality measuring unit 62 measures the quality of the S-CPICH despread signals output from the S-CPICH despreading unit 54. For example, it calculates the SIR (Signal to interference Power Ratio) of S-CPICH. The downlink quality value (for example, SIR) measured by the downlink quality measuring unit 62 is output to a radio transmitter (not shown) of the mobile station for transmission to the radio base station 100.

Figure 12:
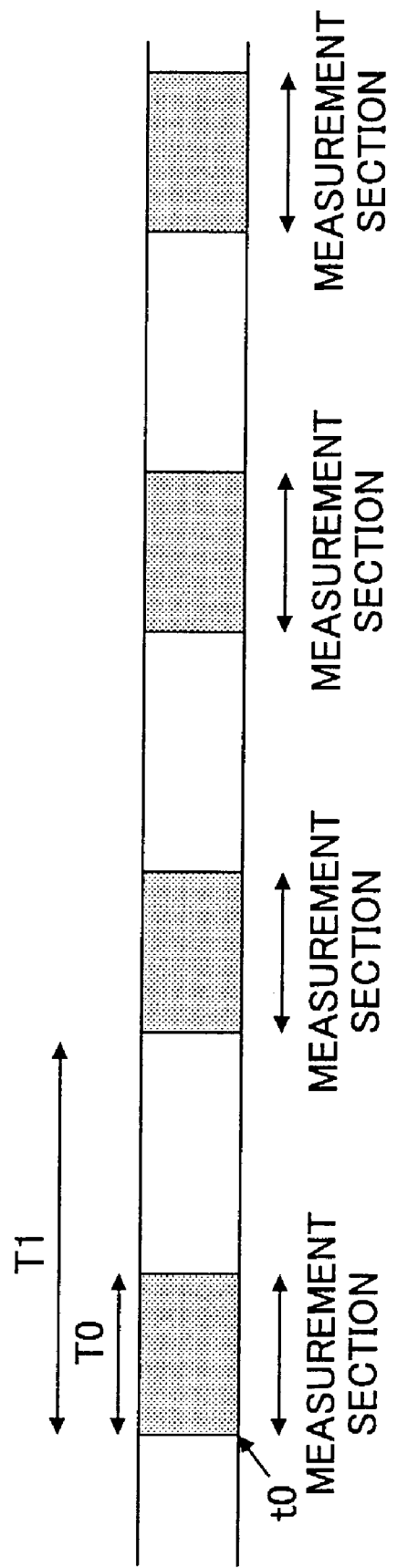
FIG. 12 is a view schematically showing a receiving sequence of S-CPICH along the time axis in a mobile station.
Figure 13:
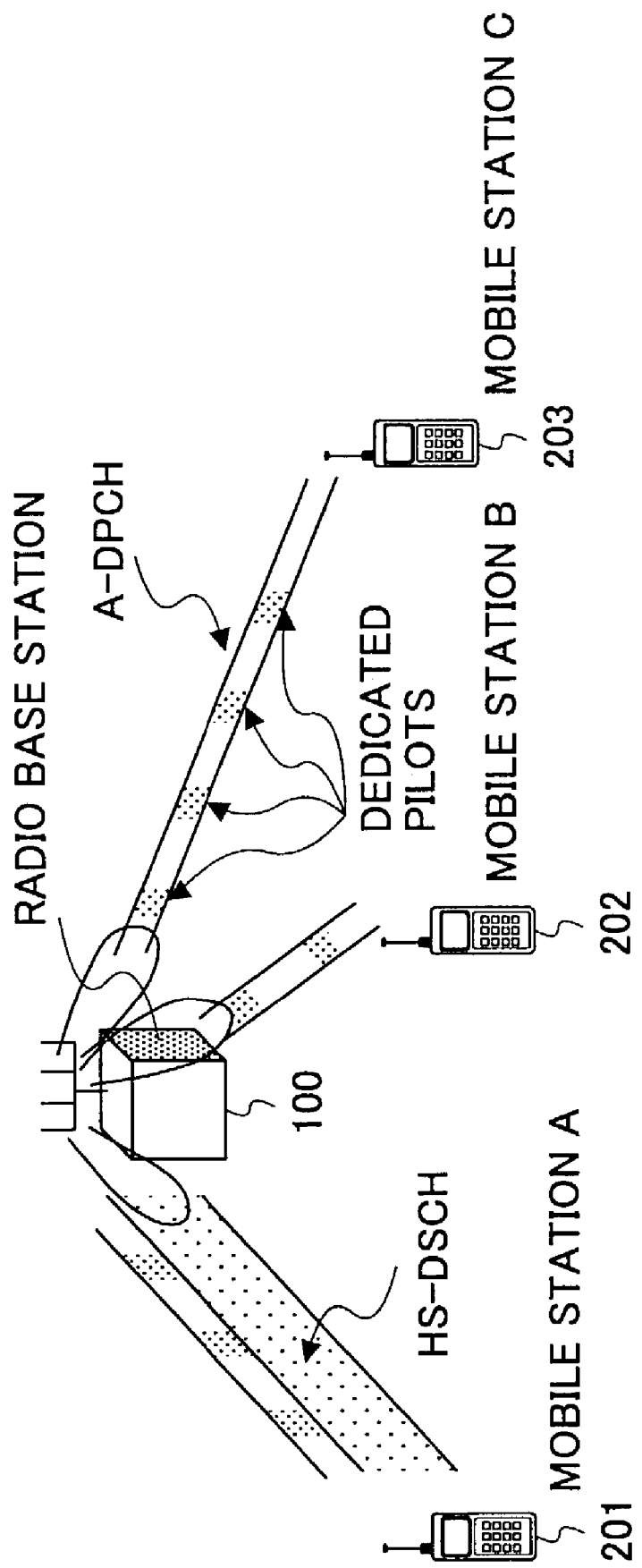
FIG. 13 is a view for explaining pilot channels used for channel estimation of a shared channel and an associated dedicated channel in the related art.
Figure 14:
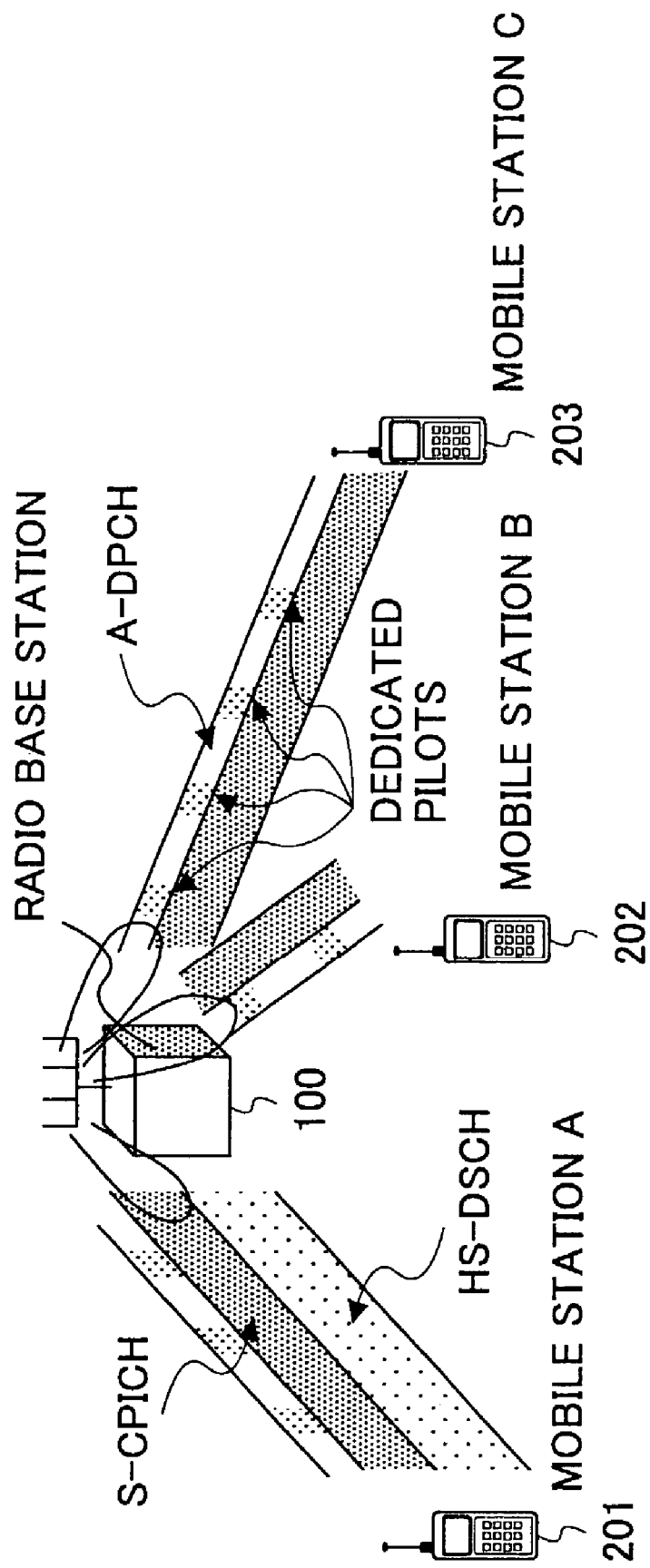
FIG. 14 is another view for explaining pilot channels used for channel estimation of a shared channel and an associated dedicated channel in the related art.

FIG. 12 is a view schematically showing a receiving sequence of S-CPICH along the time axis in a mobile station. The time intervals T0, T1 shown in FIG. 10 are time intervals in which S-CPICH is allocated to a mobile station. Further, t0 indicates one of the times when transmission of S-CPICH to the mobile station starts. As shown in FIG. 12, the mobile station is first notified via the radio network controller, and based on T0, T1, and t0, the above downlink quality is measured by using the S-CPICH despread signals only in the time interval from t=t0+nT1 to t=t0+nT1+T0 (n is an integer).

As shown above, according to the fourth embodiment, the radio base station is able to allocate S-CPICH only in the time intervals for the downlink quality measurement by mobile stations, and in the time intervals for HS-DSCH transmission, therefore shortage of transmission electric power and code resources due to usage of S-CPICH can be limited, and this enables incrementing of system capacity and improvement of communication quality.

In the above example, the pilot channel setting function of the radio base station 100 corresponds to the pilot channel setting unit, the first pilot channel setting unit, and the second pilot channel setting unit. The weight generating function of the weight generator 20 corresponds to the beam direction controlling unit. In addition, the channel estimation function of the CH estimation unit (A-DPCH) 56 and the CH estimation unit (S-CPICH) 57 corresponds to the channel estimation unit, the first channel estimation unit, and the second channel estimation unit. Further, the function of downlink quality measurement of the downlink quality measuring unit 62 corresponds to the downlink quality measuring unit.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effect of the invention, as it has been clearly shown above, according to the present invention, because the radio base station allocates a common pilot channel able to provide sufficient power to channel estimation only for demodulation of the shared channel, it is possible to limit transmission power of the common pilot channel. As a result, downlink interference can be reduced, and degradation of system capacity can be prevented. Further, in a mobile station, because the above common pilot channel is used for demodulation of the received shared channel, it is possible to improve the accuracy of channel estimation and communication quality.

This patent application is based on Japanese priority patent application No. 2002-059444 filed on Mar. 5, 2002, the entire contents of which are hereby incorporated by reference.

What is claimed is:

1. A radio base station for transmitting downlink packet data to one of a plurality of mobile stations using a shared channel together with an associated dedicated channel used in association with the shared channel, said shared channel being shared by said plurality of mobile stations and allocated to each of said plurality of mobile station per predetermined unit transmission, comprising:

a first pilot channel setting unit configured to set a secondary common pilot channel as a first pilot channel used for channel estimation of said shared channel;

a second pilot channel setting unit configured to set a dedicated pilot in the associated dedicated channel as a second pilot channel used for channel estimation of said associated dedicated channel; and a beam direction controlling unit configured to switch the beam direction per predetermined unit transmission of the shared channel and bring the beam direction to point at said one mobile station to which said secondary common pilot channel is allocated by the first pilot channel setting unit.

* * * * *